US011239013B2

(12) United States Patent
Kitagami et al.

(10) Patent No.: US 11,239,013 B2
(45) Date of Patent: Feb. 1, 2022

(54) COMPOSITE MAGNETIC POWDER, POWDER MAGNETIC CORE USING THE SAME, AND MANUFACTURING METHOD FOR COMPOSITE MAGNETIC POWDER

(71) Applicant: TDK CORPORATION, Tokyo (JP)

(72) Inventors: Masataka Kitagami, Tokyo (JP); Kenichi Kawabata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/925,753

(22) Filed: Jul. 10, 2020

(65) Prior Publication Data

US 2021/0027925 A1 Jan. 28, 2021

(30) Foreign Application Priority Data

Jul. 25, 2019 (JP) ............................. JP2019-136714

(51) Int. Cl.

| | |
|---|---|
| ***C09D 133/14*** | (2006.01) |
| ***C09D 5/00*** | (2006.01) |
| ***G02B 1/11*** | (2015.01) |
| ***B01J 13/18*** | (2006.01) |
| ***C08F 220/32*** | (2006.01) |
| ***G02B 5/02*** | (2006.01) |
| ***C09K 5/14*** | (2006.01) |
| ***H01F 1/24*** | (2006.01) |
| ***B22F 1/02*** | (2006.01) |
| ***H01F 41/02*** | (2006.01) |
| *H01F 1/33* | (2006.01) |

(52) U.S. Cl.
CPC .................. *H01F 1/24* (2013.01); *B22F 1/02* (2013.01); *H01F 41/0246* (2013.01); *H01F 1/33* (2013.01)

(58) Field of Classification Search
CPC ................................................ B22F 2201/013
See application file for complete search history.

(56) References Cited

U.S. PATENT DOCUMENTS

2007/0036669 A1* 2/2007 Toyoda ............... C22C 33/0228 419/8
2010/0193726 A1 8/2010 Maeda et al.
2019/0210104 A1* 7/2019 Yamaji ...................... H01F 1/24
2020/0258667 A1 8/2020 Ikeda et al.

FOREIGN PATENT DOCUMENTS

JP 2007-123703 A 5/2007
JP 2009120915 A 6/2009
JP 2014-120678 A 6/2014
WO 2009028486 A1 3/2009

* cited by examiner

*Primary Examiner* — Alexandre F Ferre
(74) *Attorney, Agent, or Firm* — Young Law Firm, P.C.

(57) ABSTRACT

Disclosed herein is a composite magnetic powder that includes an iron-containing magnetic powder, and an insulating layer comprising a silicon oxide formed on a surface of the iron-containing magnetic powder. An O/Si ratio of the silicon oxide constituting the insulating layer is 2.1 or more and 2.2 or less.

11 Claims, 1 Drawing Sheet

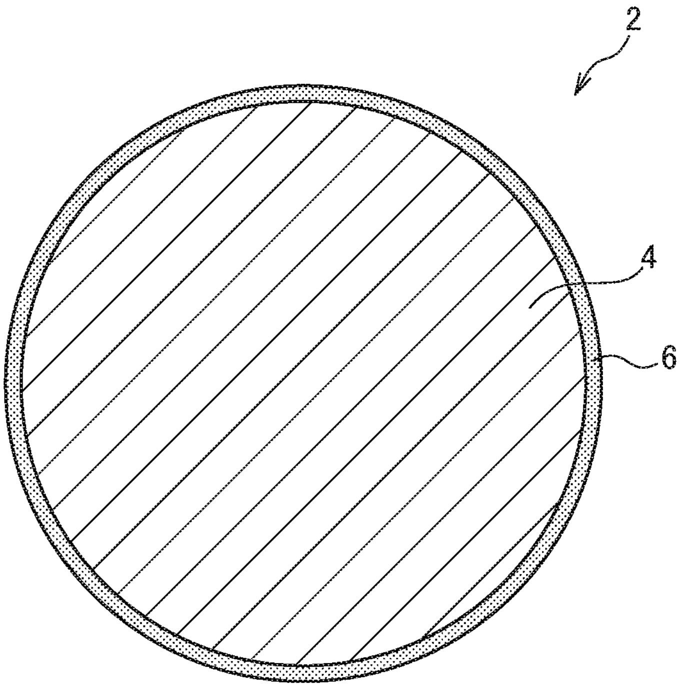
2
4
6

COMPOSITE MAGNETIC POWDER, POWDER MAGNETIC CORE USING THE SAME, AND MANUFACTURING METHOD FOR COMPOSITE MAGNETIC POWDER

BACKGROUND OF THE INVENTION

Field of the Invention

The present invention relates to composite magnetic powders and a powder magnetic core using the same and, more particularly, to composite magnetic powders each obtained by coating the surface of an iron-containing magnetic powder with an insulating layer and a powder magnetic core using the same. The present invention relates also to a manufacturing method for such composite magnetic powders.

Description of Related Art

A composite magnetic powder obtained by coating the surface of an iron powder with an insulating layer is described in JP 2009-120915A and WO 2009/028486. JP 2009-120915A discloses a method of forming an insulating layer through phosphating of the iron powder surface. WO 2009/028486 discloses a method of coating an iron powder with an insulating layer containing an organic group derived from an organic matter containing titanium, aluminum, and/or other materials.

However, it has been found that the composite magnetic powder described in JP 2009-120915A and WO 2009/028486 is significantly reduced in the insulating property of the insulating layer as a result of heat resistance test where the powder is left for a long time in a high temperature environment. Thus, the composite magnetic powder described in JP 2009-120915A and WO 2009/028486 is not necessarily suitable for applications where the powder can be exposed to a high temperature environment.

SUMMARY

It is therefore an object of the present invention to provide composite magnetic powders capable of maintaining a high insulating property even after being subjected to heat resistance test where the powders are left for a long time in a high temperature environment, a powder magnetic core using the same, and a manufacturing method for such composite magnetic powders.

Composite magnetic powders according to the present invention are each obtained by coating the surface of an iron-containing magnetic powder with an insulating layer formed of a silicon oxide. The O/Si ratio of the silicon oxide constituting the insulating layer is 2.1 or more and 2.2 or less. A powder magnetic core according to the present invention contains the above composite magnetic powders and a resin.

According to the present invention, since the O/Si ratio of the silicon oxide constituting the insulating layer is 2.1 or more and 2.2 or less, diffusion of the iron contained in the magnetic powder is suppressed. Thus, the insulating property of the insulating layer can be maintained at a sufficient level even after heat resistance test where the composite magnetic powders are left for a long time in a high temperature environment.

A composite magnetic powder manufacturing method according to the present invention includes adding a silicon ethoxide to a liquid with dispersed iron-containing magnetic powders to coat the surfaces of the magnetic powders with an insulating layer formed of a silicon oxide and applying heat treatment to the magnetic powders coated with the insulating layer at a temperature of 600° C. or more and 900° C. or less in an atmosphere containing hydrogen to modify the insulating layer.

According to the present invention, the silicon oxide formed through the hydrolysis of the silicon ethoxide is modified by heat treatment, allowing the O/Si ratio of the silicon oxide constituting the insulating layer to be 2.1 or more and 2.2 or less.

As described above, according to the present invention, there can be provided composite magnetic powders capable of maintaining a high insulating property even after being subjected to heat resistance test where the powders are left for a long time in a high temperature environment, a powder magnetic core using the same, and a manufacturing method for such composite magnetic powders.

BRIEF DESCRIPTION OF THE DRAWINGS

The above features and advantages of the present invention will be more apparent from the following description of certain preferred embodiments taken in conjunction with the accompanying drawings, in which:

FIG. 1 is a schematic cross-sectional view of a composite magnetic powder according to a preferred embodiment of the present invention.

DETAILED DESCRIPTION OF THE EMBODIMENTS

Preferred embodiments of the present invention will be explained below in detail with reference to the accompanying drawings.

FIG. 1 is a schematic cross-sectional view of a composite magnetic powder 2 according to a preferred embodiment of the present invention.

As illustrated in FIG. 1, the composite magnetic powder 2 according to the present embodiment contains an iron-containing magnetic powder 4 whose surface is coated with an insulating layer 6 formed of a silicon oxide. In the example of FIG. 1, the magnetic powder 4 has a spherical shape, but not limited thereto. The material constituting the magnetic powder 4 is not particularly limited and may be any material that contains iron and a soft magnetic property, such as pure iron, an Fe—Ni based magnetic alloy, or an Fe—Si based magnetic alloy. The grain size of the magnetic powder 4 is also not particularly limited and, for example, the magnetic powder 4 having a spherical shape has a grain size of about 1 μm to about 100 μm. Magnetic powders 4 to be used may have different grain size distributions.

The insulating layer 6 is an inorganic film formed of a silicon oxide. The O/Si ratio of the silicon oxide constituting the insulating layer 6 may range from 2.1 to 2.2. Although not particularly limited, the thickness of the insulating layer 6 may be set to about 5 nm to about 200 nm. The theoretical O/Si ratio of the silicon oxide is 2; however, when the insulating layer 6 is formed of a silicon oxide through hydrolysis of a silicon ethoxide, the silicon oxide is rich in oxygen, and the O/Si ratio of the silicon oxide exceeds 2.2. In high temperature environments, a silicon oxide having an O/Si ratio exceeding 2.2 easily transmits oxygen, oxidizing iron contained in the magnetic powder 4, which makes the iron oxide more likely to diffuse to the surface of the insulating layer 6. On the other hand, when the O/Si ratio of the silicon oxide constituting the insulating layer 6 is 2.2 or less, dense film quality is achieved, making the silicon oxide less likely to transmit oxygen even in a high temperature environment. This makes iron contained in the magnetic powder 4 less likely to be oxidized and thus less likely to diffuse. The transmissivity of oxygen is reduced as the O/Si ratio of the silicon oxide approaches 2; however, it is difficult to reduce the O/Si ratio of the silicon oxide formed through the hydrolysis of silicon ethoxide to less than 2.1.

As described above, in the composite magnetic powder 2 according to the present invention, the surface of the iron-containing magnetic powder 4 is coated with the insulating layer 6 formed of the silicon oxide, and the O/Si ratio of the silicon oxide constituting the insulating layer 6 is 2.1 or more and 2.2 or less. Thus, even when the composite magnetic powder 2 is exposed to a high temperature, the oxygen permeability of the insulating layer 6 is suppressed. This suppresses the diffusion of the iron oxide, allowing the insulating property of the insulating layer 6 to be maintained at a sufficient level even after the composite magnetic powder 2 is subjected to heat resistance test where it is left for a long time in a high temperature environment.

The composite magnetic powder 2 according to the present embodiment is molded using a resin into a powder magnetic core. The obtained powder magnetic core is used in coil components such as an inductor, a reactor, a choke coil, and a transformer, or used in motors. According to the present embodiment, the insulating property of the insulating layer 6 can be maintained at a sufficient level even when the coil component or a motor is used in a severe temperature environment, allowing improvement in product reliability.

The following describes a manufacturing method for the composite magnetic powder 2 according to the present embodiment.

The manufacturing method for the composite magnetic powder 2 according to the present embodiment is as follows. First, the magnetic powders 4 are prepared. The prepared magnetic powders 4 are put into a liquid such as ethanol and dispersed therein. Then, silicon ethoxide (TEOS) is added while the liquid with the dispersed magnetic powders 4 is maintained at a predetermined temperature. The added silicon ethoxide is gradually hydrolyzed, with the result that the surfaces of the magnetic powders 4 are coated with the insulating layer 6 formed of a silicon oxide. After reaction, the liquid is washed, diluted, and filtered to extract the composite magnetic powders 2.

The extracted composite magnetic powders 2 are dried and then subjected to heat treatment at a temperature of 600° C. or more and 900° C. or less under a hydrogen-containing atmosphere to modify the insulating layer 6. When the heat treatment is performed under the hydrogen-containing atmosphere, the silicon oxide gradually becomes complete from its incomplete state, enhancing the density of the insulating layer 6. Through this process, the silicon oxide having an initial O/Si ratio exceeding 2.2 is modified to have an O/Si ratio falling within the range of 2.1 to 2.2. The heat treatment time should be about one hour when the heat treatment temperature is in the range of 600° C. to 800° C. and about 10 minutes when the heat treatment temperature is in the range of 800° C. to 900° C. The temperature rising rate at the start of the heat treatment should be set in the range of 200° C./hour to 400° C./hour.

It is apparent that the present invention is not limited to the above embodiments, but may be modified and changed without departing from the scope and spirit of the invention.

EXAMPLES (Example 1)

Fe powders having an average grain size of 3 μm were put into a vessel, and 100 ml of ethanol was added per 30 g of Fe powders, whereby the Fe powders were dispersed in a liquid composed of ethanol. Then, the vessel was placed in an oil bath to maintain the temperature of the liquid at 40° C. In this state, 6 g of silicon ethoxide, 2 g of aqueous ammonia (ammonia concentration of 29 wt %), and 18 g of water were added, and the mixture was reacted for three hours with stirring, whereby an insulating layer having a thickness of 50 nm was formed on the surfaces of the Fe powders. After completion of the reaction, the resultant mixture was diluted and washed with a sufficient amount of ethanol and then filtered, whereby composite magnetic powders were extracted. The extracted composite magnetic powders were dried at 180° C. for eight hours in a vacuum drier. The resultant composite magnetic powders were subjected to heat treatment in a rotary tube furnace at 600° C. under a nitrogen atmosphere containing 1% of hydrogen for one hour. The temperature rising rate was set to 200° C./hour. In this way, composite magnetic powders of Example 1 were obtained.

(Example 2)

Composite magnetic powders of Example 2 were obtained in the same way as in Example 1 except that the heat treatment temperature was set to 700° C.

(Example 3)

Composite magnetic powders of Example 3 were obtained in the same way as in Example 1 except that the heat treatment temperature was set to 800° C.

(Example 4)

Composite magnetic powders of Example 4 were obtained in the same way as in Example 3 except that the heat treatment time was set to 10 minutes.

(Example 5)

Composite magnetic powders of Example 5 were obtained in the same way as in Example 4 except that the heat treatment temperature was set to 900° C.

(Example 6)

Composite magnetic powders of Example 6 were obtained in the same way as in Example 4 except that the temperature rising rate was set to 400° C./hour.

(Example 7)

Composite magnetic powders of Example 7 were obtained in the same way as in Example 5 except that the temperature rising rate was set to 400° C./hour.

(Comparative Example 1)

Composite magnetic powders of Comparative Example 1 were obtained in the same way as in Example 1 except that heat treatment was not performed.

(Comparative Example 2)

Composite magnetic powders of Comparative Example 2 were obtained in the same way as in Example 1 except that the heat treatment temperature was set to 500Ω.

(Measurement of O/Si Ratio)

The composite magnetic powders of Examples 1 to 7 and Comparative Examples 1 and 2 were individually put into a cylindrical tube, followed by surface leveling. Then, the resultant powders were applied with a load to be made into a pellet and, the obtained pellet was subjected to measurement of O/Si ratio using photoelectron spectroscopy. For measurement, Al-Kα ray monochromatized using Quantera II, manufactured by PHI, was used as an excitation X-ray, and voltage was set to 15 kV, output power was to 25 W, and analysis diameter was to ϕ100 μm. A detailed energy analysis was performed 10 times with energy (PassEnergy) applied to a spectrometer and a measurement energy interval (Step) set to 140 eV and 0.5 eV, respectively, to obtain cumulative results. For analysis in the depth direction, an Ar gas was used to perform measurement while 2 mm×2 mm area was etched at 1 kV and 7 mA. Under such conditions, $SiO_2$ is etched at a rate of 30.2 angstroms/min. In this way, the O/Si ratio at a 20 nm depth from the surface was measured.

(Measurement of FeO Diffusion Distance)

The composite magnetic powders of Examples 1 to 7 and Comparative Examples 1 and 2 were individually kneaded in epoxy resin and added with a curing agent to be thermally cured, whereby measurement samples were obtained. The obtained samples were then each cut into a thin piece using an FIB (Focused Ion Beam) system, and the thin piece was fixed on a sample holder of a TEM (Transmission Electron Microscopy). Further, the thickness of the thin piece was reduced to about 100 nm by using the FIB, and an image (200,000× magnification) was obtained by using an STEM (Scanning Transmission Electron Microscopy). The obtained image was analyzed, and the distance of FeO (dark gray in the image) advanced toward the surface of the insulating layer (light gray in the image) from the surface of an Fe powder (black in the image) was calculated.

(Measurement of Volume Resistivity)

The composite magnetic powders of Examples 1 to 7 and Comparative Examples 1 and 2 were individually weighed to be 5 g. The weighed composite magnetic powders were put into the measurement jig of Hiresta-UX MCP-HT800 manufactured by Mitsubishi Chemical Analytech Co., Ltd. After that, the volume resistivity was measured under conditions that 1 V was applied to a measurement electrode with a diameter of 10 mm and that a pressure of 20 kN was applied to the composite magnetic powders. The measurement was carried out before and after heat resistance test where the composite magnetic powders were left for 300 hours under an environment of 175° C.

(Evaluation Results)

Table 1 shows the evaluation results of the sample composite magnetic powders.

at least the surface of the insulating layer. On the other hand, in the composite magnetic powders of Comparative Examples 1 and 2, the volume resistivity after the heat resistance test was the order of $10^6\Omega$. That is, the volume resistivity was reduced to 1/100 or less or 1/1000 or less after the heat resistance test. Further, the FeO diffusion distance was 50 nm, meaning that FeO reached the surface of the insulating layer.

What is claimed is:

1. A composite magnetic powder comprising:

an iron-containing magnetic powder; and an insulating layer comprising a silicon oxide formed on a surface of the iron-containing magnetic powder, wherein an O/Si ratio of the silicon oxide constituting the insulating layer is 2.1 or more and 2.2 or less.

2. The composite magnetic powder as claimed in claim 1, wherein an average grain size of the iron-containing magnetic powder is 1 μm to 100 μm.

3. The composite magnetic powder as claimed in claim 2, wherein the iron-containing magnetic powder have different grain size distributions.

4. The composite magnetic powder as claimed in claim 1, wherein an average grain size of the iron-containing magnetic powder is 3 μm or less.

5. The composite magnetic powder as claimed in claim 1, wherein a volume resistivity of the composite magnetic powder is $10^{10}\Omega$ or more.

6. A powder magnetic core including a composite magnetic powder, the composite magnetic powder comprising:

an iron-containing magnetic powder; and an insulating layer comprising a silicon oxide formed on a surface of the iron-containing magnetic powder, wherein an O/Si ratio of the silicon oxide constituting the insulating layer is 2.1 or more and 2.2 or less.

7. The powder magnetic core as claimed in claim 6, wherein an average grain size of the iron-containing magnetic powder is 1 μm to 100 μm.

TABLE 1

| | Heat Treatment Temperature | Heat Treatment Time | Temperature Rising Rate | O/Si Ratio | FeO Diffusion Distance: Before Heat Resistance Test | FeO Diffusion Distance: After Heat Resistance Test | Volume Resistivity: Before Heat Resistance Test | Volume Resistivity: After Heat Resistance Test |
|---|---|---|---|---|---|---|---|---|
| Comparative Example 1 | — | — | — | 2.260 | 0 nm | 50 nm | $4.8 \times 10^{8}\Omega \cdot cm$ | $1.1 \times 10^{6}\Omega \cdot cm$ |
| Comparative Example 2 | 500° C. | 1 hour | 200° C./hr | 2.210 | 5 nm | 50 nm | $2.8 \times 10^{9}\Omega \cdot cm$ | $1.5 \times 10^{6}\Omega \cdot cm$ |
| Example 1 | 600° C. | 1 hour | 200° C./hr | 2.179 | 10 nm | 15 nm | $4.5 \times 10^{10}\Omega \cdot cm$ | $5.5 \times 10^{10}\Omega \cdot cm$ |
| Example 2 | 700° C. | 1 hour | 200° C./hr | 2.138 | 20 nm | 25 nm | $4.1 \times 10^{10}\Omega \cdot cm$ | $8.1 \times 10^{10}\Omega \cdot cm$ |
| Example 3 | 800° C. | 1 hour | 200° C./hr | 2.130 | 10 nm | 10 nm | $2.2 \times 10^{10}\Omega \cdot cm$ | $8.3 \times 10^{10}\Omega \cdot cm$ |
| Example 4 | 800° C. | 10 minutes | 200° C./hr | 2.184 | 15 mn | 30 nm | $1.5 \times 10^{10}\Omega \cdot cm$ | $7.5 \times 10^{10}\Omega \cdot cm$ |
| Example 5 | 900° C. | 10 minutes | 200° C./hr | 2.125 | 10 nm | 15 nm | $4.0 \times 10^{10}\Omega \cdot cm$ | $4.0 \times 10^{10}\Omega \cdot cm$ |
| Example 6 | 800° C. | 10 minutes | 400° C./hr | 2.120 | 10 nm | 15 nm | $5.1 \times 10^{10}\Omega \cdot cm$ | $5.1 \times 10^{10}\Omega \cdot cm$ |
| Example 7 | 900° C. | 10 minutes | 400° C./hr | 2.132 | 15 mn | 15 nm | $5.5 \times 10^{10}\Omega \cdot cm$ | $5.5 \times 10^{10}\Omega \cdot cm$ |

As shown in Table 1, the O/Si ratio was in the range of 2.120 to 2.184 in the composite magnetic powders of Examples 1 to 7, while the O/Si ratio exceeded 2.2 in the composite magnetic powders of Comparative Examples 1 and 2.

In the composite magnetic powders of Examples 1 to 7, the volume resistivity was $10^{10}\Omega$ or more and did not change significantly before and after the heat resistance test. The FeO diffusion distance did not change significantly either before and after heat resistance test in the composite magnetic powders of Examples 1 to 7, and the FeO did not reach

8. The powder magnetic core as claimed in claim 7, wherein the iron-containing magnetic powder have different grain size distributions.

9. The powder magnetic core as claimed in claim 6, wherein an average grain size of the iron-containing magnetic powder is 3 μm or less.

10. The powder magnetic core as claimed in claim 6, wherein a volume resistivity of the composite magnetic powder is $10^{10}\Omega$ or more.

11. A method of manufacturing the composite magnetic powder of claim 1, the method comprising:

adding a silicon ethoxide to a liquid with dispersed iron-containing magnetic powders to coat surfaces of the magnetic powders with an insulating layer formed of a silicon oxide; and applying heat treatment to the magnetic powders coated with the insulating layer at a temperature of 600° C. or more and 900° C. or less in an atmosphere containing hydrogen to modify the insulating layer.

* * * * *